Nov. 17, 1964    T. J. FLOYD    3,157,381
CARTRIDGE-RETAINED VALVE STEM SEALING MEANS
Filed Dec. 8, 1961

United States Patent Office 3,157,381  
Patented Nov. 17, 1964

3,157,381  
CARTRIDGE-RETAINED VALVE STEM SEALING MEANS  
Terence John Floyd, Wellington, England, assignor to Audco Limited, Newport, Shropshire, England  
Filed Dec. 8, 1961, Ser. No. 157,926  
Claims priority, application Great Britain, Jan. 11, 1961, 1,142/61  
3 Claims. (Cl. 251—214)

This invention relates to fluid controlling valves of the kind incorporating an angularly movable control member mounted in a body part and the object of the invention is to provide a new or improved construction which is relatively inexpensive to manufacture and which at the same time will provide efficient service in use.

In accordance with the invention there is provided a fluid controlling valve of the kind incorporating an angularly movable control member mounted in a body part wherein said control member is provided with a stem which extends through said body part and wherein there is provided a seal which embodies a single resilient annular sealing element which is disposed so that its inner periphery is in sealing engagement with said closure member stem and which is also arranged to provide a seal for preventing leakage of fluid in a radially outward direction (with respect to the axis of rotation of the closure member) at a position at or adjacent to the junction of said closure member stem and the rest of the closure member.

The resilient annular sealing element may be mounted in a rigid annular carrier having an annular recess (in which the sealing element is mounted) formed in its periphery at one end thereof and in this case said sealing element would, in its relaxed or undeformed condition, project inwardly from the inner periphery of the carrier and axially from one end thereof.

Alternatively, the closure member may be formed with an annular groove at the junction of its stem and the rest of the closure member, the resilient sealing element then being disposed in said groove to provide a seal around both its inner and outer peripheral surfaces.

Figure 1:
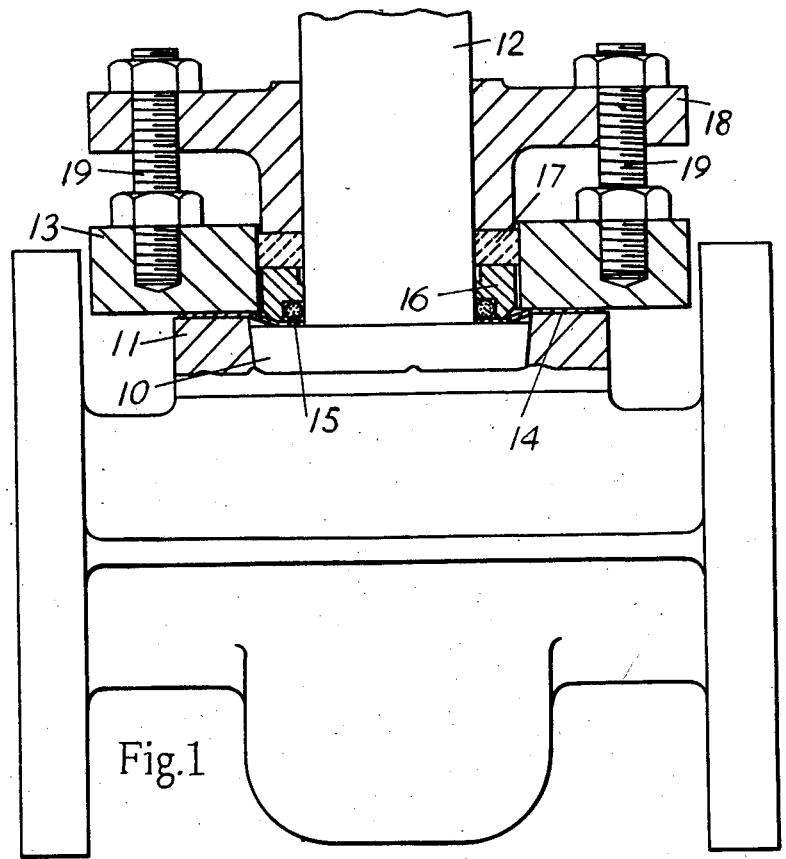
Figure 2:
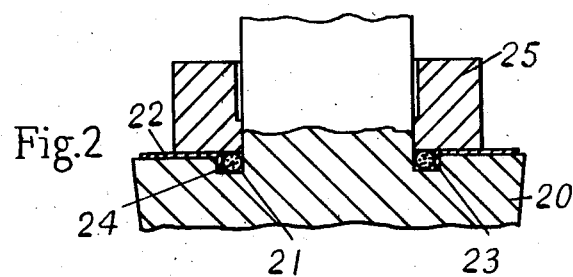
Figure 3:
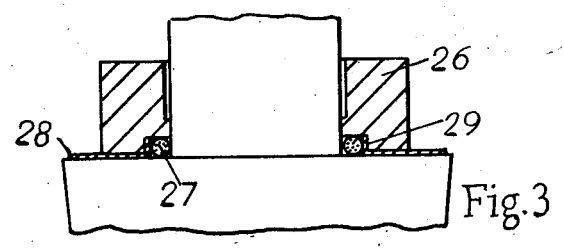

The invention will now be more particularly described with reference to the accompanying drawings wherein FIGURE 1 is a part-sectional fragmentary elevation of one example of a fluid controlling valve in accordance with the invention, and FIGURES 2 and 3 are fragmentary, part-sectional views showing respectively two alternative embodiments.

Referring firstly to FIGURE 1, the valve shown therein is provided with a closure member in the form of an angularly movable tapered plug 10 which is mounted in a body part 11 and which is provided with a stem 12 which extends through the body part and which is used for the purpose of turning said closure member to its various positions. To this end one side of the body part is provided with an aperture and over this aperture is placed a cover plate 13 having an aperture through which the valve stem 12 extends, the diameter of said cover plate aperture being greater than the diameter of the stem. Between said cover plate and the body part is mounted a thin flexible diaphragm 14 having an aperture of a diameter which is only slightly greater than the diameter of the adjacent part of the stem and through which the stem extends. Between the aperture formed in the cover plate 13 and the valve stem 12, there is mounted a seal which embodies a resilient annular sealing element 15 mounted in a rigid annular carrier 16. Said carrier may be formed of metal or other material and is formed with an annular recess in its periphery at the axial end thereof which is adjacent to the tapered plug part of the closure member. In its relaxed condition said resilient sealing element 15 projects inwardly from the carrier and also projects outwardly in an axial direction. The outer periphery of said carrier 16 may be a relatively loose fit in the aperture formed in the cover plate 13 so that a clearance exists between said cover plate and the carrier.

On that side of the carrier remote from the tapered plug is disposed an annular resilient collar 17 and on that side of said collar remote from the carrier is disposed means for applying an axial force to the seal. Said means may comprise a nut mounted on the stem or a clamping member 18 that is connected by means of bolts 19 to the cover plate 13 but in any case the arrangement is such that an axial force can be applied to said resilient collar 17 and thence through the collar to the carrier in which is mounted the annular resilient sealing elements 15. Such axial force applied to said sealing element will ensure that its inner periphery is brought into sealing engagement with said stem 12 whilst at the same time the axial end face of said element 15 which is disposed adjacent to the tapered plug will also be brought into sealing engagement with the adjacent part of said diaphragm 14. Furthermore, said diaphragm will be clamped between one axial end face of the carrier 16 and the adjacent axial end face of the tapered plug. Thus the annular resilient sealing element 15 will act to prevent any leakage of fluid outwardly along the closure member stem and will also act to prevent leakage of fluid in a radially outward direction along the outer face of said diaphragm. The latter feature means that it is not necessary to provide an accurate fit between the outer periphery of the carrier 16 and the adjacent periphery of the aperture formed in the cover plate 13.

In an alternative construction (shown in FIGURE 2) the closure member 20 is provided with an annular groove 21 which is formed in the axial end face of the tapered plug adjacent to the junction with the stem, said groove surrounding the stem. The diaphragm 22 is provided with an axially directed flange 23 around the periphery of the aperture formed therein, said flange being arranged so as to extend into the aforementioned groove 21 to engage the outer annular periphery thereof. The single resilient sealing element 24 is in this case mounted in said groove 21 and a clamping ring 25 is mounted on the stem so that it can be moved in an axial direction to engage the adjacent axial end face of the sealing element and provide sealing engagement between the inner periphery of said element and said stem on the one hand and between the outer periphery of the sealing element and the aforementioned flange 23 on the other hand. As before the clamping ring 25 need not be a close fit in the aperture formed in the cover plate (not shown in FIGURE 2) and the sealing element will act to provide a seal against the stem of the closure member and also to prevent leakage of fluid in a radially outward direction.

In FIGURE 3, the valve is provided with a rigid annular carrier 26 having at one axial end an annular recess formed in its inner periphery and in which is mounted the resilient annular sealing element 27 in a manner similar to that described in the embodiment shown in FIGURE 1. In this case however, the diaphragm 28 has an axially outwardly extending flange 29 which projects into the recess formed in the carrier 26.

Having thus described my invention what I claim as new and desire to secure by Letters Patent is:

1. A fluid controlling valve comprising a body having a passage therein for fluid flow and a valve means accommodating opening, a valve means rotatably mounted in said body for controlling fluid flow through said passage, said valve means including a flow controlling member operatively related within said passage and opening and a stem projecting beyond said opening, a rigid annular carrier surrounding the stem and having an annular recess in its inner periphery at one axial end thereof, an apertured diaphragm surrounding said opening and having a portion in engagement with said flow controlling member with the stem passing through the aperture, said diaphragm being provided around the periphery of the aperture therein with an axially projecting flange which extends into said annular recess of the carrier, a single resilient annular sealing element in said annular recess at the juncture of the stem and the flow controlling member in contact with the stem and the diaphragm and means co-operable with said sealing element for urging said sealing element into sealing engagement with said stem and diaphragm and thereby preventing leakage of fluid in the axial and radially outward directions respectively.

2. A fluid controlling valve comprising the combination of a body having a passage therein for fluid flow and a plug-accommodating opening, a flow-controlling plug rotatably mounted within said passage and opening, a stem secured to the plug and projecting beyond said opening, an apertured diaphragm surrounding the opening, having a plug-engaging portion with the stem extending through the aperture and being formed around the periphery of the aperture therein with an axially projecting flange, a rigid annular carrier surrounding the stem beyond the diaphragm and having formed therein an annular recess into which said diaphragm flange projects and which defines an annular space bounded by the carrier, the stem, the diaphragm and the plug, a single resilient annular sealing element disposed in said annular space said sealing element being compressed radially between the flange and the stem and compressed axially between the carrier and the plug, and means for applying axial pressure on the carrier to thrust the latter into engagement with the diaphragm.

3. A fluid controlling valve comprising the combination of a body having a passage therein for fluid flow and a plug accommodating opening, a flow-controlling plug rotatably mounted within said passage and opening and having formed therein an annular recess, a stem secured to the plug and projecting beyond said opening, an apertured diaphragm surrounding the opening, having a plug-engaging portion with the stem extending through the aperture and being formed around the periphery of the aperture therein with an axially projecting flange extending into said recess in the plug, a rigid annular carrier surrounding said stem beyond the diaphragm, said recess in the plug defining an annular space bounded by the carrier, the stem, the diaphragm and the plug, a single annular resilient sealing element disposed in said annular space, said sealing element being compressed radially between said flange and the stem and being compressed axially between the carrier and the plug, and means for applying axial pressure to the carrier to thrust the latter into engagement with the diaphragm.

References Cited in the file of this patent

UNITED STATES PATENTS

| 1,800,552 | Martin | Apr. 14, 1931 |
| 2,718,665 | Clade | Sept. 27, 1955 |
| 2,820,470 | Sanders | Jan. 21, 1958 |
| 2,876,987 | Renfro | Mar. 10, 1959 |
| 2,926,884 | Clinkenbeard | Mar. 1, 1960 |

FOREIGN PATENTS

| 1,057,841 | Germany | May 21, 1959 |
| 1,208,297 | France | Feb. 23, 1960 |